Dec. 12, 1967     C. F. B. STEVENS     3,357,377
COMBUSTION OF ORGANIC WASTE MATERIAL
Filed Sept. 3, 1965     3 Sheets-Sheet 3
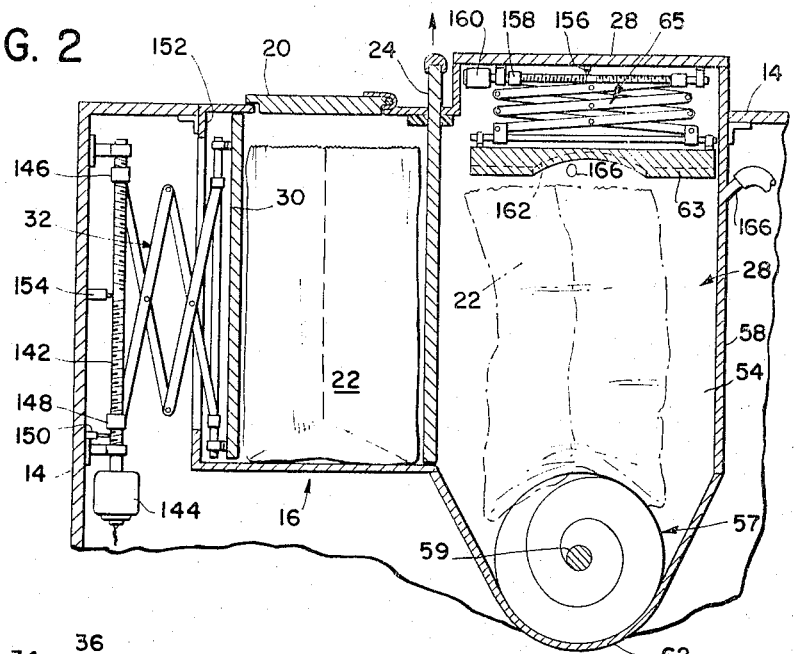
FIG. 2
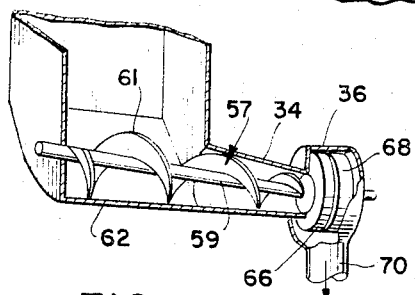
FIG. 4
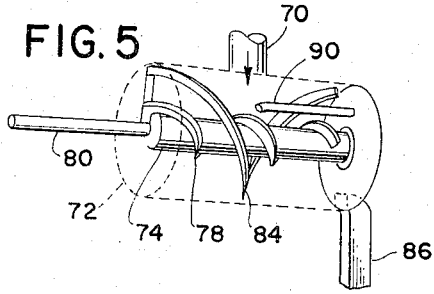
FIG. 5
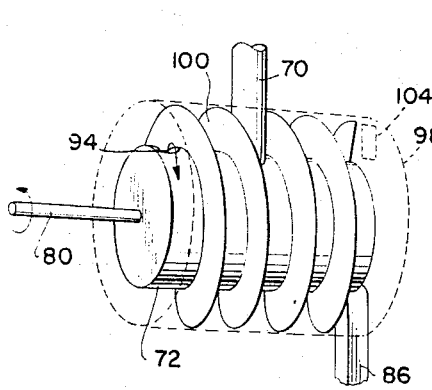
FIG. 6
FIG. 7

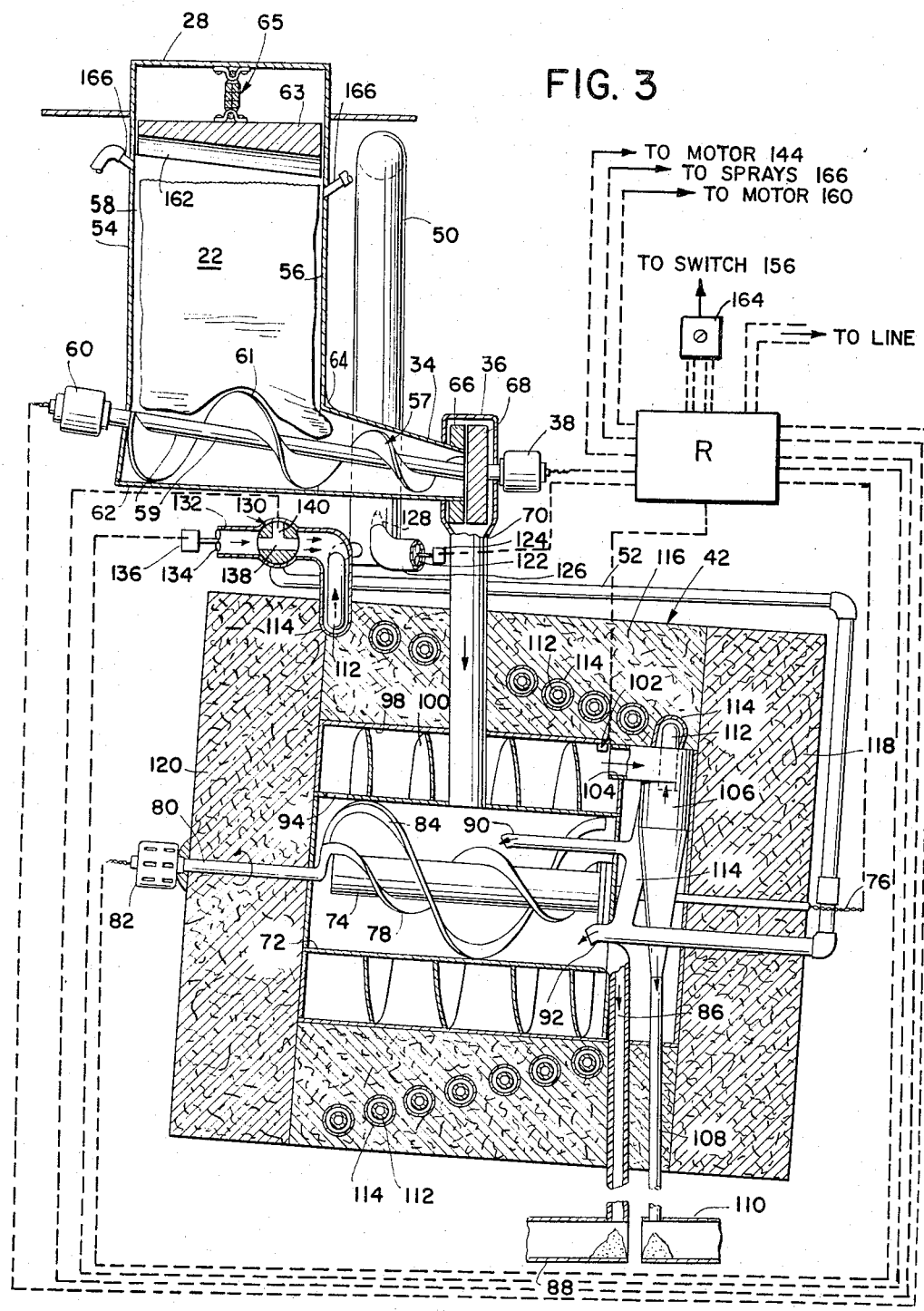

United States Patent Office 3,357,377
Patented Dec. 12, 1967

3,357,377
COMBUSTION OF ORGANIC WASTE MATERIAL
Charles F. B. Stevens, Pierrefonds, Quebec, Canada, assignor to Pulp & Paper Research Institute of Canada, a corporation of Canada
Filed Sept. 3, 1965, Ser. No. 484,861
18 Claims. (Cl. 110—8)

ABSTRACT OF THE DISCLOSURE

An appliance suitable for installation in a domestic kitchen to make final disposal of household garbage at the time and place of accumulation by combustion to such a high degree that substantially only water vapor and $CO_2$ are discharged to atmosphere and inert ash is automatically discharged to permanent storage vault elsewhere in building. Batch of garbage in broken up and fed at a constant rate to grinder from which blobs of comminuted garbage drop directly upon constantly scraped bare metal surface preheated and maintained at a high temperature and located in a first combustion chamber. Spattering and scraping of dried material from the heated surface is effective to disperse the material, at the rate of infeed, in particulate form inter a turbulent current of preheated air supplied at a rate such as to maintain oxygen in predetermined excess of maximum demand. Particulate material is retained in the first chamber for drying, pyrolysis and evolution of gaseous substances; and mixture of gaseous substances and preheated air is continuously conducted to second chamber comprising a passageway narrow enough to maintain turbulence and long enough to provide residence time sufficient at the maintained temperature to complete combustion of all combustible gaseous materials. Solid particles remaining in first chamber are burned to ash and are discharged at end of cycle.

(A) *Background*

(1) SCOPE

This invention relates to a method and an apparatus for the final disposal of organic wastes.

More particularly, this invention relates to a method and apparatus for the disposal of organic wastes such as garbage which normally has a low average oxygen demand but which at times has inclusions with very high oxygen demand, in small quantities at the time and place of production by their combustion to innocuous gases and sterile ash to an acceptable degree of completeness. By "garbage" is meant food residues, together with food wrappings soiled with food, as customarily disposed of from the kitchen, but excluding non-grindable non-combustibles such as glass or metal containers and the like; by "combustion" is meant union with oxygen (normally atmospheric oxygen) at elevated temperature at or near atmospheric pressure; and by "complete" combustion is meant that the products of combustion have zero residual oxygen demand; and the degree of completeness (in percent) achieved in any particular instance is defined by the following formula:

$$\frac{(\text{Orig. } O_2 \text{ demand}) - (\text{sum of resid. } O_2 \text{ demands of prods.}) \times 100}{\text{Orig. } O_2 \text{ demand}}$$

when "$O_2$ demand"=stoichiometric oxygen demand. All demands are to be stated herein in pounds per pound of feed.

(2) DISADVANTAGES OF PRESENTLY ACCEPTED METHODS OF GARBAGE DISPOSAL

Present methods of disposing of garbage from urban and suburban areas consist of its collection by vans, or (after grinding and suspension in water) by sewers, for ultimate disposal at a central point. These methods have well-recognized disadvantages. Collection by vans requires the garbage to be stored on the premises till collection day, which breeds flies, odours, and bacteria. Van-collected material is difficult to burn because of the tramp non-grindable non-combustibles which become mixed with it during collection. Central disposal by either incineration or burial usually creates a foul ground conflicting with the sanitary standards and the growth plan of the community. Grinding and sewering garbage, on the other hand, cannot usually dispose of such food residues as soiled wrappings and large bones; even so it frequently causes stoppage of the soil pipe after a few years' practice; and it merely postpones final disposal, for which there must be means provided at the other end of the sewer.

(3) DISADVANTAGES OF CONVENTIONAL INCINERATION AT THE POINT OF PRODUCTION

The disadvantages of disposal by central collection could be avoided by burning the garbage completely to carbon dioxide, water vapor, and ash, at the point of production—for maximum convenience, in the kitchen itself. But although many types of incinerator exist, all those known to applicant suffer from drawbacks which have prevented their general acceptance for urban and suburban areas, and for kitchen installation. Of these drawbacks, the most important is that the flue gases are incompletely burned, especially at the start of the incineration cycle, and hence constitute a source of air pollution. A second drawback is that the solid residue from incineration has to be removed manually from the unit for final disposal elsewhere, which is not a suitable operation for the kitchen, especially since the residue is not always completely burned either. Thirdly, the management of heat is frequently poor, so that with a very wet charge, excessive external energy or excessive time or admixture of dry trash is required; while with a charge of high heating value, the surface of the unit becomes too hot.

(4) TWO-SYSTEM NATURE OF COMBUSTION

The most important defect underlying the above disadvantages is incompleteness of combustion. When a particle of garbage is heated preparatory to combustion, it first dries evolving water vapour and organic volatiles; then breaks down under the action of heat to both gaseous and solid pyrolysis products; the former burn to carbon dioxide and water vapour, while the latter burn to carbon dioxide, water vapour, ash, and carbon monoxide which later burns to carbon dioxide also. That is to say, the complete combustion of such a charge involves (a) a gas-gas system in which the organic volatiles, the gaseous pyrolysis products and the carbon monoxide burn, and (b) a solid-gas system in which the solid pyrolysis products burn; and these two systems, though basically different, are necessarily linked by the passage of air and gas-phase material containing combustibles from the latter to the former. Therefore not only must the factors be found which govern completeness of combustion in each system, but also means of imposing adequate values of these two sets of factors while their respective systems are operated in sequence.

(5) BASIC FACTORS GOVERNING THE COMPLETENESS OF GAS-GAS COMBUSTION

The patents and literature relating to the incineration art show recognition of the extent to which the degree of completeness of gas-gas combustion depends upon the temperature to which the combustion mixture is heated. It does not seem to be recognized in this art, though known to the broader science of combustion, that completeness of combustion also depends upon the quantity of air present in excess of that to be consumed in combustion, the thoroughness of mixing of the air with the combustible molecular species and the time this mixture spends at the reaction temperature. But further, even in the highly developed science of burning of fuels, for example, the factor of excess air is usually expressed as a percentage of the air to be consumed in combustion, i.e. of the stoichiometric air demand; while applicant's work indicates that the effect of a given percent excess air is reduced by the presence of large amounts of inerts, such as water vapour, so that this effect is proportional rather to the partial pressure of excess air (or, more strictly speaking, of excess oxygen) in the combustion mixture. This "partial pressure of excess oxygen" can also be expressed as the partial pressure of the oxygen which would remain in the gaseous combustion products if combustion were absolutely complete.

(6) PRACTICAL PARAMETERS ON WHICH BASIC FACTORS DEPEND

To obtain a given degree of combustion with a given material in a gas-gas system therefore requires supplying the above four governing factors—excess partial pressure of oxygen, thoroughness of mixing, temperature, and time—in some adequate combination of values. But because the volume of the mixture of combustion air and gas phase to be burned is (at atmospheric pressure as per definition) normally so large that apparatus of practical size cannot contain it all at once, these basic factors have to be applied to a continuously flowing system, through a number of practical parameters which are related to the basic factors in a complex way. Thus, the excess partial pressure of oxygen in such a system depends upon the rate of air addition, and the oxygen demand and flow rate of the gas phase to be burned. The thoroughness of mixing of the air and the gas phase depends on the turbulence of their combined flow, which (in the absence of moving parts) depends upon the dimensions of the flow passage, the mass rate of the combined flow, and its viscosity, which depends to a considerable extent upon its temperature. The temperature depends on the heat of combustion released, the rate of heat supply (if any) from an external source, and the fraction of the heat in combustion products which is transferred back to the air and gas-phase infeeds (e.g. through preheaters). Finally, the residence time depends on the volume of the reaction space divided by the volumertic flow rate of the reaction mixture.

(7) NATURAL VARIATION OF PRACTICAL PARAMETERS AND BASIC FACTORS

To obtain a given degree of combustion it is therefore necessary to provide at all times values of these practical parameters which will result in an adequate combination of values of the basic factors. In the conventional incinerator the waste is usually charged en masse into a primary combustion space, which is connected through a rather wide secondary combustion space to a flue, both combustion spaces being provided with heat (usually a gas flame), and with air by natural draft through inlets of fixed size, the air usually being ducted around the combustion spaces to give some degree of preheat. Hence, of the practical parameters in such units, the reaction zone dimensions and the rate of heat supply from the external source are fixed; while the flow rate of gas phase to be burned, its oxygen demand, the rate of air addition, and the fraction of the heat in combustion products transferred back to infeed, all start at zero, and increase together with the natural draft as the incineration cycle proceeds. This means for the basic factors, that residence time starts long, and subsequently decreases; temperature and thoroughness of mixing start practically at zero and subsequently increase; while the partial pressure of excess air probably also starts low and subsequently increases, but may decrease again during maximum rate combustion if the air inlets are too small. The fact that combustion of the gas-phase products in such units is commonly incomplete at the start of the cycle, indicates that the natural linkage between the natural draft and the other variable parameters cannot be relied upon to keep the combination of basic factor values adequate at all times for the gas-gas combustion system. Accordingly the present invention seeks, by controlling the practical parameters separately and mechanically, to keep each basic factor at (or above) a fixed value which has been chosen as one of an adequate combination of basic factor values.

(8) CONDITIONS FOR FIXING THE BASIC FACTORS THROUGH THE PRACTICAL PARAMETERS

The temperature can be kept within a narrow range by providing a thermocouple in the reaction zone which through relays will turn the external heat source on and off, and bypass the air preheater, as required—provided that the heat of combustion in the feed is less than the sum of the surface heat loss and the heat loss in exit gases when the preheater is bypassed, which is the case with garbage except for slugs too small to need consideration from the heat standpoint. The partial pressure of excess oxygen would be kept above a given minimum if an upper limit could be assigned to the oxygen demand of the gas phase to be burned, and if the flow rates of the air and of the gas phase to be burned could be fixed. The combined flow rate of the air and the gas phase to be burned then would be constant and this, combined with appropriate reaction zone dimensions would give the local turbulence required for a fixed efficiency of mixing, and a fixed residence time.

(9) LINKING THE GAS-GAS WITH THE SOLIDS-GAS SYSTEM

The gas phase to be burned is evolved from the solid phase (a) during drying (volatile organics), (b) during pyrolysis (gaseous pyrolysis products) and (c) during combustion (carbon monoxide). These heterogeneous reactions are enormously accelerated at any given temperature by sub-dividing the solid phase and contacting it with fresh, hot, rapidly-flowing air. Hence the flow of gas phase to be burned can be kept constant by comminuting the material to be burned, feeding and dispersing it continuously at a substantially constant rate into a reaction space, and there heating it so rapidly in a current of preheated air that drying, pyrolysis, and combustion—and hence gas evolution—proceed at a rate practically the same as that of feeding, any slight lag which occurs in this regard being taken up in residence time of the burning solids, which due to their small individual volumes is not a critical matter.

Since the more air that passes over the comminuted solids the faster drying, pyrolysis, and combustion will be, preferably all the air—including that required for the gas-gas combustion later—is passed over the solid to begin with. Constant flow rate of this air can be maintained by a fan chosen in relation to the resistance of the flow passages, provided such resistance does not change substantially during operation due to the accumulation of ash.

The fact that the reactions of drying, pyrolysis, and combustion are carried out on each increment of waste in such rapid succession smooths out the differences in oxygen demand between the gases produced in these respective reactions, so that the rate of oxygen demand actually varies only with that of the feed, and the upper limit of the rate of oxygen demand can be estimated from the expected range of feed composition. Based on such an upper limit the rate at which air is constantly supplied is so chosen as to assure that at least a selected minimum partial pressure of excess oxygen will be maintained at all times.

Thus are met the three conditions of paragraph 8 for keeping the basic factors at (or above) a single adequate combination of values, and hence achieving a given degree of completeness of combustion in this system, namely: (1) Assigning an upper limit to the oxygen demand of the gas phase to be burned, (2) fixing the flow rate of the gas phase to be burned, and (3) fixing the flow rate of the air.

(10) COMPLETENESS OF COMBUSTION IN THE SOLID-GAS SYSTEM

In the conventional incinerator the material to be burned is fed en masse and not disturbed during incineration, so that the solids acquire a heavy coating of ash towards the end of the cycle, when the natural craft—which is induced largely by the combustion of the gas phase—is diminishing as evolution of this phase comes to an end. Hence, contact between the air and the interior of the residual solid phase frequently becomes so slight that combustion ceases before the solids have burned through. In the present invention, the measures taken to accelerate gas evolution from the feed—comminution, dispersion, rapid heating, and mixture with hot turbulent air—of course also correct the above situation, and drive combustion in the solid phase to a very high degree of completeness.

(11) AUTOMATIC DISPOSAL OF ASH

The second drawback of conventional incinerators—namely, that solid residue (often partly unburned) has to be removed and disposed of elsewhere—can now be eliminated. In the present invention, the ash is not only burned to a very high degree of completeness, but also is in the form of a fine, free-flowing powder, which is produced in very small volume per day. It is therefore possible to discharge it automatically down an enclosed chute, preferably for permanent disposal in a sealed vault beneath, which can be of quite reasonable size and yet serve for the life of the building.

(12) MANAGEMENT OF HEAT

The continuous mode of feeding makes the third drawback of conventional incinerators—namely, poor heat management with feeds of very low or very high heating value—easier to remedy, in that it smooths out the great variation in heat demand and heat release which occurs over the course of the conventional batchwise incineration cycle.

(B) *Objects and brief description*

It is therefore an object of this invention to provide a method and apparatus for the disposal of wet organic wastes such as garbage without the foregoing disadvantages, and which take advantage of the above findings.

Another object of this invention is to give final disposal by combustion to wet organic wastes such as garbage at the time and place of production to the very high degree of completeness required in an urban area.

Another object of this invention is to provide an apparatus which comminutes waste, feeds it at a reasonably steady rate through an easily-cleaned device, redisperses it to a considerable degree, provides enough air, mixing, heat, and time to burn both the gaseous and the solid products to an acceptable degree of completeness, and automatically deposits the solid product as a powder of ash in a permanent vault.

Another quite specific object of this invention is to provide in the general form of a domestic appliance an apparatus which will burn wet wastes with the consumption of no more electrical energy and space than is normally available in a family residence and which satisfies the criteria of unit surface temperature, safety, and reliability dictated by amateur operation within finished living space.

Other objects of the invention will be apparent from the following description.

According to the present invention the foregoing objectives are accomplished by comminuting the waste, dropping it blobwise at a reasonably constant rate onto a highly-heated, continually-scraped surface in the continually-scraped interior of a first combustion chamber supplied with turbulent preheated air at a fixed rate sufficient to give a predetermined minimum partial pressure of excess oxygen for that type of waste, thereby dispersing, drying, and pyrolyzing said blobs and evolving gas-phase material containing combustibles substantially at the rate of feeding, to form gas-phase and solid-phase products; admitting the mixture of gas-phase products and air through a baffled opening into a heated second combustion chamber of such dimensions as to enclose said mixture for a predetermined time in turbulent flow without long-range back-mixing at a predetermined temperature, said time, temperature, turbulence, and partial pressure of excess oxygen being sufficient in combination for the combustion of said mixture to the desired degree of completeness; removing any suspended ash particles from said combusted mixture and depositing said particles in a permanent vault; transferring to the incoming air most of the heat in the said cleaned combusted mixture and venting the latter to the atmosphere; keeping the solid-phase products in contact with the turbulent current of air in the heated first chamber until burned to a high degree of completeness; finally withdrawing the ash from the first combustion chamber and depositing said particles in another permanent vault.

Heat economy for low-heating value feeds (and economy also of reaction chamber volume) is achieved by preheating the incoming air with the exit gases. In order to have uniform operating conditions from startup, this requires bringing the system to thermal equilibrium, with the combustion chambers at operating temperature, before beginning to feed. Heat economy is also improved by reducing surface losses (which are relatively very high in high-temperature small-scale apparatus) by nesting the heated surface and first combustion chamber, second combustion chamber, and air preheater coaxially in that order from inside to outside, and insulating the outer surface of this assembly thoroughly. On the other hand excessive internal and surface temperatures with high heating value feeds are avoided by providing a thermosensitive device successively to turn off the external heat source and to bypass the air preheater. Optionally in addition, the combustion air may be taken from between the said assembly and the appliance outer skin.

(C) *Detailed description*

(1) STRUCTURE AND CONTINUOUS OPERATION

The present invention will be better understood by reference to the accompanying drawings, which illustrate one electrically heated form of the apparatus suitable for practising the invention. It will be understood that the invention is capable of many modifications, and that changes in the construction and arrangement may be made without departing from the spirit and scope of the invention as defined in the appended claims.

In said annexed drawings:

FIGURE 2 is a vertical sectional view taken along the line 2—2 in FIGURE 1;

FIGURE 3 is a vertical sectional view generally along the line 3—3 in FIGURE 1;

FIGURE 4 is a perspective phantom view of the feeding and grinding mechanism; and FIGURES 5, 6 and 7 are perspective views of the combustion and air-preheating components in successive stages of assembly, namely:

FIGURE 5 shows interior components of the first combustion chamber,

FIGURE 6 shows assembly after fitting the second combustion chamber, and

FIGURE 7 shows assembly after fitting the preheater.

Figure 1:
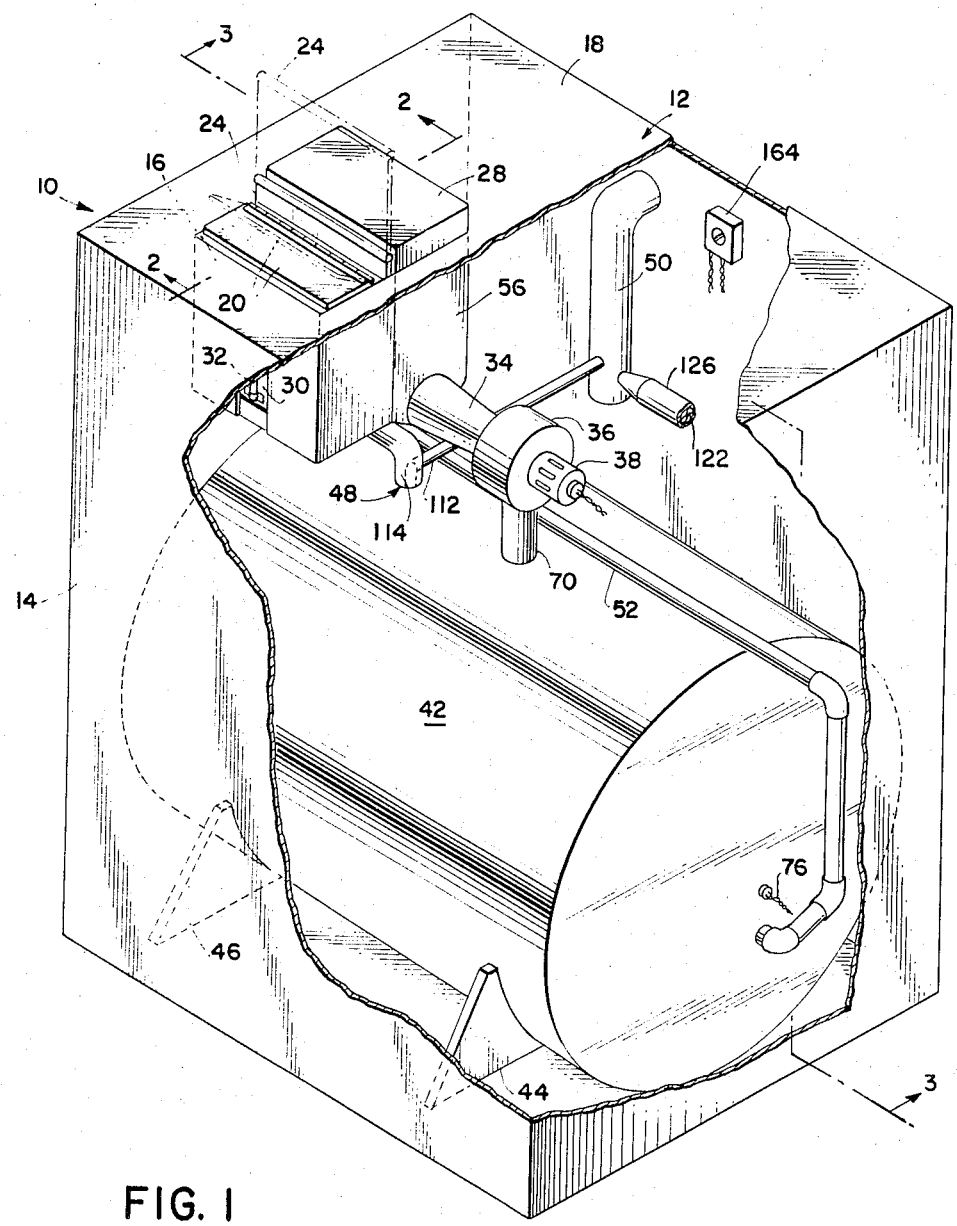
FIGURE 1 is a perspective view of the major assemblies of a waste combustor embodying the present invention.

Referring now to the drawings in FIG. 1 there is illustrated apparatus embodying the present invention which is of such form and, as will be apparent from a subsequent portion of this specification, is of such size as to be capable of installation in the kitchen of a private residence in much the same manner as an automatic dish washer or the like. Thus, in FIG. 1 a waste combustor generally indicated at 10 is enclosed in a rectangular case 12 the front wall 14 of which has been broken away to reveal the general arrangement of the assemblies therein. A receiving chamber 16 opens into the top wall 18 and is fitted with a hinged lid 20 to afford access to the interior of the chamber 16. The chamber 16 is generally rectangular in shape and preferably is of such size as to receive a paper or other disposable garbage bag 22 (see FIG. 2) of generally conventional size, for example the bag 22 may have a rectangular cross section of about 8" by 5" and may be 16" tall although it will be understood that these dimensions are merely illustrative. The rear vertical wall of the receiving chamber 16 is indicated at 24 and it consists of a slidable panel which may be raised to the broken-line position shown in FIG. 1 in order that the garbage bag 22, when filled, may be pushed horizontally from the receiving chamber 16 into a feeding and delivering chamber 28 which is positioned to the rear of the receiving chamber 16. Any suitable means may be used for facilitating the transfer of the filled bag 22 from chamber 16 to chamber 28. Illustratively there is shown in FIG. 2 a movable piston 30 substantially coextensive with the front wall of chamber 16. The piston 30 may be actuated by any suitable means, for example, a scissors jack indicated generally at 32, to move toward the rear as viewed in FIG. 1 thus propelling the filled bag through the opening afforded by withdrawal of the sliding rear wall 24. After such operation the piston 30 is retracted forwardly, the sliding rear wall 24 is closed and a fresh empty garbage bag 22 may be inserted in the receiving chamber 16 for receiving a new charge of garbage during the processing of the former charge as will be discussed hereinbelow.

In FIG. 1 there is shown a tapering passageway 34 of generally circular cross section, a grinder 36 and a motor 38 of a type suitable for driving the grinder 36. Also in FIG. 1 there is shown a vertically disposed passageway 70 extending from the grinder into a combustor unit 42 which is generally cylindrical in conformation and is enclosed in a heavy layer of insulating material as will be described in more detail hereinbelow. The combustor unit 42 may be supported in any suitable manner, as for example by brackets 44 and 46. The combustor unit 42 is provided with an air inlet and flue gas outlet indicated generally at 48 the outlet of which is connected with a flue 50 which preferably opens through the rear wall of the casing 12 for connection with a flue pipe leading to the atmosphere. Also as shown in FIG. 1 the combustor unit 42 is provided with a bypass air inlet line indicated generally at 52. It will be apparent that in FIG. 1, as in the remaining figures in said drawings, supports, brackets and the like largely have been omitted to avoid confusion and because the construction thereof is not essential to a disclosure of this apparatus to those skilled in the art.

Referring now to FIG. 2, which is a vertical sectional view taken generally in the plane indicated by the line 2—2 in FIG. 1, the interiors of the receiving chamber 16 and feeding chamber 28 are disclosed. The chamber 28 is closed at the top and is made up of three vertical walls 54, 56 and 58 (FIG. 3), the fourth vertical wall comprising the sliding panel 24 (FIG. 1) when the latter has been moved to a closed position. The bottom of feeding chamber 28 is faired into a transverse passage the outer surface of which is indicated at 34 in FIGS. 1 and 4. The passage 34 tapers and is circular in cross section so as to receive snugly the small end of a tapered helical screw conveyor 57 mounted upon an inclined shaft 59 the outer end of which is driven by a motor 60, preferably of the gear reduction type. The helical screw conveyor 57 has flights 61 which have progressively diminishing diameter and pitch starting from the left as viewed in FIG. 2. The lower periphery of the conveyor 57 rides snugly in the faired semi-cylindrical bottom portion 62 of the feeding chamber 28 and extends directly into the passage 34. Thus, upon energization of the motor 60 the filled garbage bag 22 and its contents will be progressively fed by the conveyor 57 into the tapering passageway 34 and large fragments will be broken or cut against the edge of the inlet to the passageway 34 which is reinforced as indicated at 64 (see FIG. 3). The taper of the helical conveyor 57 and the conforming taper of the passageway 34 serve to deliver the waste as a reasonably void-free mass toward the grinder 36. The bottom of passageway 34 is slightly inclined towards the grinder 36 for drainage. During this operation the filled bag 22 is pressed downwardly by a piston 63 driven, for example, by a scissors jack 65.

The grinder 36 includes a stationary ring-shaped burr 66 surrounding the outlet of passageway 34 and a rotary burr 68 driven by the motor 38. Upon energization of the motor 38 during the period that the waste material is being fed through the passageway 34 such waste material will be ground and will drop from between the burrs as blobs of comminuted material which will gravitate through feed tube 70 to the interior of the combustor unit 42.

It will be recognized that the combination of the positively driven piston 63, the helical conveyor 57 and grinder 36 will supply the waste material to the interior of the combustor unit 42 in a relatively finely divided state and at a rate which is reasonably constant throughout the feeding operation. The spacing between the burrs 66 and 68 will determine the degree of fineness of comminution and of course the finer the material is divided the more slowly it will be dropped from between the burrs to fall down the feed tube 70. The rate of feed thus established and the degree of fineness of comminution, supplies, as will be more fully disclosed hereinbelow, an important substantially constant factor upon which the design of the combustor unit 42 may be based. The motors 60 and 38 for driving the conveyor 57 and grinder 36 respectively are chosen to have sufficient power to maintain such reasonably constant rate of production by volume of ground waste over the whole range of resistance to be expected from the class of waste to be disposed of in the apparatus. Since the specific gravities of most organic waste materials are close to 1.00 the rate of feed by weight is also reasonably constant.

The vertical feed tube 70 extends downwardly through outer elements of the combustor unit 42 and opens into a first combustion chamber 72 which is cylindrical and is positioned on an axis which is somewhat inclined from the horizontal to facilitate final scavenging of solids therefrom. Within the combustion chamber 72 and coaxial with it, is a cylindrical heating element 74 which, illustratively, may be an electrical heating element supplied through wires 76 and which is fixed against rotation. The surface of the heating element 74 is continuously scraped by a spiral skeleton scraper 78 the driven end of which is secured to a shaft 80 which in turn is rotated by a motor 82. The inner cylindrical surface of the first combustion chamber 72 also is scraped by a spiral skeleton scraper 84, the driven end which also is secured to said shaft 80. The lowermost portion of the periphery of the first combustion chamber 72 opens into a vertical ash chute 86 which extends downwardly out of the unit and through the floor of the building to a permanent vault 88.

Air, usually preheated as will be explained hereinbelow, is supplied at a constant rate to the first combustion chamber 72 through a jet 90 directed toward a point on the heating element 74 directly below the feed tube 70. Air also is introduced to the first combustion chamber 72 through a jet 92 located just above the opening into the ash chute 86. The rate of air introduction to the first combustion chamber 72 is chosen in relation to the rate of waste feed and the maximum oxygen demand of the type of waste being processed in such manner that the excess partial pressure of oxygen will always be greater than the minimum chosen as adequate for combustion to the desired degree in combination with the chosen values of the other factors, namely, residence time, temperature and turbulence (thoroughness of mixing).

Each blob of waste falling down the feed tube 70 first strikes heating element 74, and (if the consistency of said blob is low enough) spreads out due to impact and to the inclination of heating element 74 from the horizontal. The blob immediately receives heat from the heating element 74 by conduction, and from the inner walls of the first combustion chamber 72 by re-radiation and from the preheated air by convection, especially from the jet 90 directed at the point of impact of the waste material upon the heater 74.

Water present in the waste will evaporate very rapidly and if present in substantial quantity, with such violence as to spatter the blob over the inside walls of first combustion chamber 72. This disperses the content of the blobs still more and increases the rate of heat absorption by such content thus reducing the time otherwise required by very wet waste to finish the sequence of drying and pyrolysis.

As the blobs dry out they are scraped from the spots on which they fall or to which they may have spattered and they become dry particles. The demand of such dry particles for latent heat being satisfied the temperature thereof rises very rapidly and they decompose thermally (pyrolyze) into solid and gas-phase products. The gas-phase products of pyrolysis (comprising gases, vapors, smokes, mists and suspended particles) mix rapidly with the incoming preheated air. Such air is kept in a cyclonic turbulent state of flow by the shape of the spiral skeleton scraper blades 78 and 84 and by the positions of the air jets 90 and 92 whereby the products of pyrolysis rapidly reach combustion temperature and begin to burn. Solid-phase products of pyrolysis which thus begin to burn evolve carbon dioxide and carbon monoxide which mix with the other gas-phase products.

An opening 94 (see FIG. 2 and also see FIG. 6) is located in the uppermost peripheral portion of the first combustion chamber 72 through which the gas-phase products, mixed with air, continuously flow from the first combustion chamber to a second combustion chamber which will be described hereinbelow. However, it will be understood that the first combustion chamber is made sufficiently large and the gas flow therein is maintained sufficiently turbulent that despite the blob-wise feeding of the waste material into the apparatus the composition and the flow rate of the mixture of gas-phase products and air leaving the combustion chamber 72 through the opening 94 is reasonably constant. The volume of the first combustion chamber 72 must be large enough to contain the accumulation of solids while they are pyrolyzing, burning and after they have been reduced to ash. For this reason not all of the volume of the first combustion chamber 72 can be counted in calculation of residence time for the gases at maximum temperature.

The opening 94 may be baffled by means (not shown) the details of which are not essential to the present disclosure, to prevent the exit from the first combustion chamber 72 of large particles which might become entrained in the mixture of gas-phase products and air which flows through said opening 94. It is not necessary, however, that the baffling of the opening 94 be so efficient as to preclude the exit of relatively small entrained particles since they are disposed of by means to be described.

A second combustion chamber is indicated generally at 98. It is preferably cylindrical and co-axial with the first combustion chamber 72 but of larger diameter whereby such second combustion chamber 98 is annular. The chamber 98 is divided by a continuous system of baffles 100 into a continuous path small enough and long enough to cause turbulent flow which will give local mixing without long-range back-mixing and short circuiting. The pattern of the baffles 100 illustrated in FIGS. 2 and 6 is a simplified one consisting merely of a single helical strip bearing along its inner diameter upon the outer surface of the first combustion chamber 72 and bearing at the outer diameter against the inner surface of the second combustion chamber 98. This simplified illustrated arrangement, of course, would provide a single spiral path for the gas and air mixture to follow as it flows from the opening 94 toward the right as viewed in FIG. 2. As a practical matter the path thus afforded probably would not be adequate in length or small enough in cross section to create the desired turbulence and to insure that all elements of the gas and air mixture will be retained at least for a chosen minimum retention time. The actual pattern required to create desired turbulence and freedom from short-circuiting and back-mixing depends on flow characteristics and will be discussed in detail in the section hereinbelow on design calculations. For the present it is sufficient to state that a plurality of cylindrical casings similar to the casing 98 but of progressively decreasing diameter may be nested concentrically within the casing 98. Between each of such casings there may be provided a spiral baffle such as the baffle 100. The alternating ends of each such casing will be in communication in series whereby the gases will have to flow continuously from end to end of each successive casing before they are permitted to escape from the second combustion chamber 98. The total volume of the second combustion chamber 98 is so chosen as when added to the volume of the first combustion chamber 72 to provide the chosen minimum retention time for the air and gas mixture.

The second combustion chamber 98 receives heat indirectly from the heating element 74 and from the burning of the combustible portions of the waste. The temperature in the chamber 98 is placed under the control of a thermosensitive unit 102 which, for example, is located adjacent the exit 104 from the chamber 98. The thermo-sensitive element 102 is arranged through suitable relay mechanism in relay box R to turn the heater 74 on and off as required to maintain within a reasonably narrow range a preset operating temperature. Such operating temperature is chosen as sufficient in combination with the chosen values of the excess oxygen partial pressure, residence time and thoroughness of mixing to achieve combustion of the waste material to the desired degree of completeness. The rate of heating by the element 74, when it is turned on, must at least equal the surface loss from the apparatus as a whole plus the heat lost in stack gases, both at full operating conditions minus the minimum heating value of the feed (as discussed below in the section on design calculations the minimum heating value of the feed is zero in the final stages of operations in which the apparatus is being internally washed down). At the opposite end of the scale the heating value of the feed may be so high that the temperature sensed by the thermo-sensitive unit 102 will continue to rise after the electrical heating element 74 is turned off. Under such conditions cooling must be initiated. For example, the sensing of such a condition may be caused to substitute cool air for the preheated air normally supplied to the first combustion chamber 72.

The exit 104 from the second combustion chamber 98 leads to a cyclone 106 in which the exiting mixture of air and gases is separated from ash particles suspended or entrained therein. The ash particles will gravitate downwardly through the tapering body of the cyclone 106 to a vertical chute 108 through which they will fall to a second permanent vault 110 provided elsewhere in the building. The cleaned mixture of air and gases will leave the cyclone 106 to enter a pipe 112. The pipe 112 extends into an outer pipe 114, concentric therewith, to form a double-pipe heat exchanger. As shown in FIG. 3 the wall of the outer pipe 114 is sealed around the pipe 112 above the cyclone 106 and the pipe 114 then extends downwardly behind the cyclone 106 where it opens into the air-supply nozzle 90 and 92 described above.

For heat economy the cyclone 106 and the inner portions of air-supply pipe 114 are nested closely with the right-hand ends of the combustion chambers 72 and 98 as viewed in FIG. 3. The heat-exchanger 112, 114 is coiled in helical form around the outside of the second combustion chamber 98, each turn of the helix having a progressively greater diameter (see FIG. 7) as the coil progresses toward the left as viewed in FIG. 3. The coiled heat exchanger is embedded in a thick annular body of insulating material 116 which surrounds the second combustion chamber 98. The ends of the combustion chambers 98 and 72 are enclosed in disc-shaped bodies of insulation 118 and 120. The thickness of the insulating bodies 116, 118 and 120 is calculated with regard to the maximum temperature reached within the combustion chambers 72 and 98 so as to insure that the exterior surface temperature of said insulating bodies will not exceed a maximum chosen temperature appropriate for the location of the cumbustor unit. It will be recognized that when the combustor unit is in operation the innermost portions of the insulating material will assume a temperature approximately equal to the maximum operating temperature of the unit and that the temperature of the insulating material will be progressively lower at points approaching the exterior surfaces thereof. The temperature gradient within the body of insulation 116 (see design calculations below) is calculated and the length and rate at which the diameters of the coils of the heat exchanger 112, 114 increases are so selected that, at full operation of the combustor, the surface temperature of each increment of length of the heat exchanger is approximately equal to the temperature which the immediately adjacent portions of the insulating body 116 tend to assume from the heated combustion chambers. In this manner heat loss is further minimized with the accompanying advantage that the surface temperature of the insulating body 116 will remain more nearly constant during periods of extended full operation of the combustor.

The air supply pipe 114 separates from the pipe 112 externally of the insulation 16. As shown in FIG. 3 the inner pipe 112 emerges through the wall of the outer pipe 114 which is sealed around the point of emergence.

The inner pipe 112 communicates with the interior of the flue 50. The flue 50 is considerably larger in diameter than the pipe 112 whereby draft-inducing air may be injected into the flue 50. For example there may be provided a fan 122 driven by a motor 124 (see FIG. 3) to propel air into a receiver 126 which is faired into a nozzle 128 directed upwardly of the flue 50. Air is supplied by the fan 122 to the nozzle 128 at such a rate as to induce the mixture of gases and air emerging from pipe 112 to flow upwardly through flue 50. Preferably the rate at which air is thus supplied is such as to maintain a subatmospheric pressure within the first combustion chamber 72 under all conditions of operation. Thus there will be no danger of escape of smoke or gaseous materials through the feed chute 70 and any leakage at the lid 20 will be inward from the kitchen or other space in which the combustor unit is installed.

The air supply pipe 114 is connected through a valve 130 with an intake 132 in which is positioned a fan 134 driven by a motor 136. The valve 130 has a movable body provided with a passageway 138 and a branch passageway 140. When the valve 130 is in the position illustrated in FIG. 3 air supplied by the fan 134 goes through passageway 138 into the air supply pipe 114 of the preheater 112, 114. When the valve 130 is turned through 90° in a counterclockwise direction the air enters passageway 138 and leaves through branch passageway 140 to enter the cool air supply pipe 52.

As indicated above the air supplied to the interior of the combusion chambers 72 and 98 normally is preheated to reduce heat losses and to reduce the temperature of the stack gases. Thus the valve 130 is normally in the position shown in FIG. 3. The entering air from fan 134 may be at room temperature, or if the air is drawn from within the enclosure 12, it will be somewhat above room temperature, perhaps approaching the surface temperature of the bodies of insulation 116, 118 and 120. As such air flows through the outer pipe 114 of the heat exchanger it picks up heat from the exiting air and gas mixture within inner pipe 112. When the combustor is at full operating temperature the entering air is thus progressively heated to a temperature at any given point which approaches the temperature of the portions of the insulating material 116 immediately adjacent the pipe 114 and, as the air enters combustion chamber 72 through nozzles 90 and 92 it has reached a temperature approaching that of the interior of the chamber 72.

Also, as noted above, when the heating value of the feed is so high that, with the heater 74 shut off, the temperature sensed by unit 102 continues to rise, the sensing unit 102 is operative through relays in relay box R and suitable actuating devices, not shown, to move valve 130 to such position that the cool air from fan 134 is conducted directly through by-pass pipe 52 to the nozzles 90 and 92. Cool air thus introduced to the first combustion chamber 72 will reduce the temperature of the mixture of air and gas in said chamber as well as in the second chamber 98 and when normal operating temperature is sensed by the unit 102 the valve 130 is returned to the position shown in FIG. 3.

The rate at which air is supplied by intake fan 134 is balanced against the ejector fan 122 and against the gas flow resistance of all parts of the combustor not only so that the subatmospheric pressure within the combustor may be maintained, as referred to above, but also so as to supply air at a rate adequate to assure combustion of the waste material to desired degree of completeness. As noted above the jet or nozzle 90 is positioned just above the area of the heater 74 upon which the comminuted waste material first falls. Such positioning is desirable inasmuch as the air discharged from the nozzle 90 will help to disperse the waste material and also supply oxygen at the point where combustion is initiated. The jet or nozzle 92 is positioned above the opening into the ash chute 86. Such positioning is desirable inasmuch as the air discharged from the nozzle 92 will promote turbulence in the lower portion of the combustion chamber 72 and also will blow suspended particles of waste material away from the ash chute opening thus preventing premature entry of particles into the ash chute 86.

While the proportions and relative positioning of major components shown in the drawings are reasonably accurate it will be noted, particularly in FIG. 3, that certain components have been shown somewhat diagrammatically and in positions better suited for illustration of flow patterns than for maximum economy of space. For example, the air supply fan 134 and ejector fan 122 have been shown undersized and in a position which would not be appropriate for fans and driving motors of actual size. Also, it will be recognized that it may be preferable to use squirrel-cage or other efficient blowers rather than the simple fans which have been illustrated.

The scissors jacks 32 and 65 (see FIG. 2) are merely illustrative since any desired mechanism may be used to move the pistons 30 and 63 respectively. Both scissors jacks should be provided with conventional limiting and reversing switches suitably interlocked with switches actuated by the lid 20 and sliding panel 24. For example, the scissors jack 32, which has the conventional oppositely-threaded shaft 142, rotated by a motor 144 and internally threaded runners 146 and 148, may have a switch 150 so positioned as to stop and prepare the motor 144 to reverse when the runner 148 reaches a position corresponding with retraction of the piston 30 to a position nesting substantially against the front wall 152 of the receiving chamber 16. Also, there may be provided a switch 154 so positioned as to stop and immediately reverse the motor 144 when the runner 148 reaches a position corresponding with projection of the piston 30 toward the right as viewed in FIG. 2 into an extreme position generally within the opening left when the slide 24 is elevated.

The switches 150 and 154 also preferably are interlocked with switches, not shown, associated with the lid 20 and slide 24 whereby movement of the piston 30 toward the right cannot be initiated unless the cover 20 is closed and the slide 24 is fully elevated. As a matter of fact the movement of the slide 24 may be utilized to initiate operation of the combustor if so desired. Thus, after the garbage bag 22 in the receiving chamber is filled or otherwise is ready for destruction the operator will close the lid 20 and will elevate slide 24 which, when it reaches fully open position will close a switch (not shown) energizing motor 144 and locking lid 20 by a conventional magnetic lock (not shown). When piston 30 has transferred the bag 22 into chamber 28 the switch 154 will automatically reverse motor 144 and piston 30 will be retracted whereupon switch 150 will stop motor 144 and unlock lid 20. The slide 24, which also may be provided with a lock (not shown) or which may share the lock for the lid 20 to prevent downward movement while the piston 30 is in motion, may now be moved downwardly to fully closed position in which it actuates a switch (not shown) which initiates through suitable relays in relay box R the comminution and combustion cycle. Preferably also, the latter switch is so arranged as at least to deenergize the motor 60, thus stopping the screw conveyor 57, in the event the slide 24 is prematurely lifted from fully closed position. The lid 20 may be opened at any time after the piston 30 has retracted but this offers no potential danger inasmuch as the conveyor 57 will not be in operation if the slide 24 has not been fully closed. Ordinarily the operator will open the lid 20 to put a new empty garbage bag 22 in the receiver 16 after he has closed the slide 24 and the lid 20 thereafter may be opened at any time during the comminution and combustion cycle when it is desired to place waste material in the new bag 22.

If, by mistake, some object has been included in a load of waste which cannot be handled by the screw conveyor 57 and the conveyor jams, the operator may raise the slide 24, which will cut the power off the conveyor 57, and working through the open lid 20, the operator ordinarily will be able, safely, to clear the jam despite the fact that the combustion cycle continues in full operation. This is because the combustion chambers operate at subatmospheric pressure and fresh air flowing in through the open lid 20 will prevent back-flow of hot or noxious fumes through the feed chute 70.

Initiation of operation of the combustor, for example by lowering the slide 24 to fully closed position described above, is effective through suitable relays in relay box R first to turn on the heating element 74 and to energize the motors 124 and 136 for driving the fans 122 and 134. This condition continues until both combustion chambers become preheated to full operating temperature. The reaching of such temperature will be sensed by the sensing unit 102 which is effective through suitable holding relays in relay box R to energize the motors 60 and 38 which power the screw conveyor 61 and grinder 36 respectively. In this manner the very first blob of waste material which is dropped from the grinder will enter the first combustion chamber 72 while the same is heated to full operating temperature. As pointed out above the thermosensitive unit 102 is effective during the combustion cycle to control the heating element 74 and the air supply valve 130 but such operation will not affect the conveyor 61 and grinder 36 inasmuch as the motors for the latter have been energized through the holding relays aforesaid.

Simultaneous with initiation of the grinding and conveying cycle the scissors jack 65 located in the upper portion of the feeding chamber 28 (see FIG. 2) is put into operation whereby positively to lower the piston 63 upon the waste material in bag 22 pressing such waste material into engagement with the flights 61 of screw conveyor 57. The scissors jack 65 for the piston 63 may be substantially identical with the scissors jack 32 described hereinabove. A reversing switch 156 may be positioned so as to be struck by a runner 158 when the piston 63 has been projected to its lowermost position whereupon the motor 160 is reversed and the piston 63 will be retracted to the position shown in FIG. 2. It will be understood that the scissors jack 65 will be provided with a limit switch for deenergizing the motor 160 and for preparing it to operate in the opposite direction when it is next energized and that such switch (not shown) may be similar to or identical with the switch 150 provided for the scissors jack 32. As shown particularly in FIG. 2 the piston 63 is provided with a concave portion 162 on its underside which conforms approximately to the shape of the screw conveyor 57 whereby during the brief period that the piston 63 remains in its lowermost position the flights 61 of the conveyor 57 will scrape the surface of the concave portion 162 thus assuring substantially complete feeding of the waste material to the conveyor. As noted above the speed at which the piston 63 is lowered is so selected as to insure as closely as possible a steady rate of supply of waste material to the screw conveyor 57 which is so related that the rate of comminution thereof by the grinder 36 as to furnish a feed of comminuted material down the chute 70 at substantially the rate for which the apparatus has been designed. As will be pointed out in the section on design calculations hereinbelow this rate of feed may be relatively slow, for example at about one pound per hour, which nevertheless will be adequate for the disposal of waste of this general type originating in an average household.

When the piston 63 reaches its lowermost position and the reversing switch 156 is operating, the operation of this switch also may be effective to start a program timer 164 (see FIGS. 1 and 3), which initiates the required shutdown operations at instants $T_1$, $T_2$, etc., separated by appropriate preset intervals in the following sequence:

$T_0$: Timer starts.

*Interval 1.*—Adequate for conveying last of feed to grinder 36, grinding it, dropping it down chute 70, and completing its combustion together with that of any residue which remains in first combustion chamber 72 from previously-fed material.

$T_1$: Timer switches on a water valve (not shown) which supplies hot water under pressure to a plurality of nozzles 166 (see FIG. 3) distributed within the feeding chamber 28 in such a manner as to spray water on the major interior surfaces of the chamber as well as the surfaces of the screw conveyor 57.

*Interval 2.*—Adaquate to wash fragments of waste material from these surfaces.

$T_2$: Timer shuts off spray nozzles 166.

*Interval 3.*—Adequate to pass all wash water, and waste material dislodged thereby, through screw conveyor 57, grinder 36, and chute 70 into first combustion chamber 72.

$T_3$: Timer shuts off motor 60 driving screw conveyor 57, and motor 38 driving grinder 36.

*Interval 4.*—Adequate for the evaporation of the wash water, and the drying and combustion of the associated fragments of waste material.

$T_4$: Timer shuts off heater 74 and fans 122 and 134. The ash in primary combustion chamber 72, which was heretofore largely suspended in the turbulent flow of air, now settles to the bottom of said chamber.

*Interval 5.*—Adequate for spiral scraper 84 to convey all ash in primary combustion chamber 72 into the mouth of ash chute 19.

$T_5$: Timer shuts off scraper motor 82, and finally itself; spring returns timer mechanism to start position.

(D) *Modifications*

(1) MORE RAPID HEATING

Modifications are possible in the above design without altering its basic principles. For example, should a more rapid rate of heating be desired than can be supplied by the heating element 74 located coaxially within the first combustion chamber 72, an additional or alternative heating element or elements may be so positioned as to envelope the exterior surface of the chamber 72.

(2) OTHER HEAT SOURCES

Further, it is possible to supply the heat in other than electrical form, for example by hot gases from the prime mover or an auxiliary power plant of an aircraft, bus, ship, mobile home or train; or from the combustion of oil or gas fuel specifically for this purpose. Such hot gases could be led through a central cylindrical chamber, or annulus between the combustion chambers 72 and 98, replacing the electrical heating element 74. Said hot gases could also be introduced directly into the first combustion chamber 72; in this case additional air would be required to preserve the desired partial pressure of excess oxygen in face of the total gas volume, and the dimensions of both combustion chambers would have to be increased for the same reason to maintain the same residence time. However, if gas were burned on the inner surface of the first combustion chamber 72, e.g., by making this wall porous and introducing the gas through an annulus between the first and second chambers, a much higher temperature could be maintained within the first combustion chamber than is possible with electrical resistance heating, providing of course that the materials of construction of the unit were made capable of withstanding it. This higher temperature would then tend to reduce the residence time and/or excess partial pressure of oxygen required for the same degree of completeness of combustion, and hence to counteract the effect of the greater volumetric rate of the gas phase due to the direct admixture of heating gases.

(3) OTHER TYPES OF FEEDING MECHANISM

The feeding mechanism described above is designed to handle waste which is wet, but still too stiff to be pumped. If, however, it is known that the waste presented to a unit will always be a pumpable slurry, or on the other hand will always be so dry as to be grindable to a free-flowing powder, then other and more specifically appropriate means of feeding at a constant rate can be employed. For example, a small quantity of pumpable slurry can conveniently be fed by collecting it after comminution in a cylindrical chamber from which it is displaced by a piston moving at constant speed; and a free-flowing powder can conveniently be fed at a constant rate in gas suspension.

(4) OTHER TYPES OF WASTE

Garbage originating in a family dwelling ordinarily will comprise a mixture of waste materials which, as received, have widely different stoichiometric oxygen demands ranging, for example, from pure fat (lard) which has the highest-expected oxygen demand of anything normally found in garbage to vegetable scraps, cucumbers or the like which have very low oxygen demands. The domestic appliance which has been chosen for illustrative disclosure herein is designed not only to handle loads comprising a mixture of such waste materials but also is designed to handle the occasional unusual loads which might comprise almost exclusively materials having a low or high oxygen demand. For waste materials having a known and less variable oxygen demand the apparatus may be designed within limits which are proportionately narrower and some economies in original cost and in consumption of power or externally supplied heat may be realized.

(5) OTHER ENVIRONMENTS

For use in environments other than a living space, for example in hotels, institutions and the like, the size and the capacity of the combustor may be appropriately enlarged. Also, for use by professional or trained operators in industrial surroundings some of the interlocking features may be omitted. Also, variable controls by which one or more of the selected basic factors may be varied, in predetermined manner, may be provided whereby a range of waste materials of various types may be disposed of with maximum efficiency both as to time and power consumption.

(E) *Sample design calculation (for domestic appliance)*

(1) ASSUMPTIONS

Material to be burned: garbage.

Maximum oxygen demand per lb. total solids $(h) = 2.7$ lb. $O_2/lh.$ total solids (fat).

Maximum percent total solids in waste material $(y) = 100\%$ (fat).

(2) SELECTED VALUES OF THE BASIC FACTORS (i) Combustion chamber operating temperature = 1500° F.

(ii) Minimum partial pressure of excess oxygen $(p) = 0.03$ atm. abs. (this is about 15% of the partial pressure of oxygen in air).

(iii) Efficiency of mixing in the gas phase corresponding to a Reynolds' Number $(N_{Re}) = 2100$.

(iv) Gas residence time at operating temperature = 3 sec.

(v) Rate of feed of waste material = 1 lb./hr. (chosen as adequate for a combustor sized for the average residence).

The above values of the basic factors have been selected as forming a combination which is adequate to ensure the combustion of garbage to the high degree of completeness appropriate to a built-up area, yet one which does not call for an unusually high value of any one factor which might be difficult to provide in a practical device. It will be understood, however, that the same degree of combustion could be obtained by other combinations of other values of these factors—for example by a higher temperature and a higher turbulence combined with a proportionately shorter time and a lower minimum partial pressure of excess oxygen—in theory, at least, over a wide range of each individual factor. Furthermore, a still higher degree of completeness of combustion could be obtained, if called for by community regulations, by increasing the value of some or all of the basic factors—for instance by a longer time and a higher partial pressure of excess oxygen, combined with the same temperature and the same turbulence. It is a prime feature of this invention that specific values of these basic factors of combustion can be provided to order through the practical parameters embodied in the above design sized by calculations of the following type.

(3) Calculation of fixed flow rate of air required to make the minimum partial pressure of excess oxygen $(p) = 0.03$ atm. abs.

$$\text{Flow rate} = 0.0432hy + \frac{1.13p}{0.21 - p}[0.0432hy + 0.01425(100 - y)]$$

$$= 13.9 \text{ lb. air/hr.} = 172 \text{ ft.}^3 (STP) \text{ air/hr.}$$

(4) Total volume gaseous combustion products = (172)(1.1) = 190 ft.³ (STP)/hr. = 0.21 ft.³ (1500° F., 1aa)/sec. very nearly without regard to waste composition.

(5) If, to mix the pyrolysis products with preheated air and to hold the ash during one cycle, the primary combustion chamber is made 0.5 ft. dia. x 1 ft. long = 0.2 ft.³ vol., then the gases will remain in this chamber about $$\frac{0.2}{0.21} = 1 \text{ sec.}$$

(6) Assuming that 70%, i.e. 0.7 sec., of this time can be counted as time at temperature, then 3.0−0.7=2.3 sec. of gas residence time remains to be provided in the second combustion chamber 98. The volume of the latter will then need to be (2.3) (0.21)=0.48 ft.³. This volume is provided by an annulus 0.22 ft.=2.6 in. wide around the curved surface only of the first combustion chamber 72; the first and second combustion chambers together will then form a cylinder 11.2 in. dia. x 12 in. long.

Since the viscosity $\mu$ of air at 1500° F. is 0.108 lb.-mass/(hr.)(ft.), and the mass flow W of gaseous combustion products is 13.9+1.0=14.9 lb./hr., the required turbulence can be created in the second combustion chamber 98 by making the actual passage through this chamber of square cross section with side $$D = \frac{W}{N_{Re}\mu} = 0.066 \text{ ft.} = 0.8 \text{ in.}$$

Such a passage can be arranged in this annulus by dividing it into 3 concentric sub-annuli each of approximately $$\frac{2.6}{3} = 0.8 \text{ in. width}$$

providing each with a spiral baffle the turns of which are spaced at intervals of 0.8 in., and causing the gaseous combustion products to pass spirally through each sub-annulus in succession before leaving this chamber and passing into the cyclone. (This of course is only one of a number of possible ways of creating the required turbulence within this chamber.)

(7) The cyclone size required for a flow of 0.21 ft.³/sec. is, according to the usual design relations, about 2.25 in. max. dia. x 9 in. high. Locating it in the rear of the combustion chamber cylinder would then give an assembly overall about 11.2 in. high and 15 in. long.

(8) For an assembly of these dimensions at 1500° F., 5 in. of insulation with a thermal conductivity of 0.06 B.t.u./(hr.)(ft.²)(° F./ft.) gives, by both calculation and experiment, a steady-state temperature of 135° F. at the insulation outer surface. The resulting cylinder is 21.5 in. dia. x 25 in. long in outside dimensions.

(9) The temperature drop across the wall of the air preheater 112, 114 is chosen as 200° F.; its duty is therefore to heat 13.9 lb. air/hr. from say 70° F. to 1300° F.=4410 B.t.u./hr. while cooling 14.9 lb. non-condensibles and water vapour from 1500° F. to 270° F.=5170 B.t.u./hr., leaving a margin of 750 B.t.u./hr. for losses (but see below).

A double-pipe air preheater (such as 112, 114) 1 in. in total diameter is chosen, its circular cross section being divided in the ratio of throughputs so that the hot stream flows in a central tube 0.72 in. dia., and the cold stream in an 0.14 in. annulus. Both flows are calculated to be turbulent. The heat exchange area is 0.19 ft.² per running ft. and the overall rate of heat exchange is calculated as 4.2 B.t.u./(hr.)(ft.²)(° F.), so that a total heat exchanger length of approximately 30 ft. is required.

This length is disposed in a tapered coil (112, 114) encircling the combustion chamber-cyclone assembly and buried in 5 in. thick insulation (see FIGURES 3 and 7). The radial distance of each turn from the surface of the second combustion chamber is made such that the temperature of the coil surface, and that of the insulation in contact with it, are everywhere about the same. This minimizes the heat loss from the preheater coil without requiring additional insulation, and without increasing the heat loss from the surface of the second combustion chamber.

The average turn of the preheater coil is about 4 ft. in length, and about 8½ turns are therefore required. Allowing 0.5 in. between turns, and 1.5 in. for the vertical feed tube 70, gives an outside length dimension for said coil of 15 in., which matches the 15 in. length of the assembly it envelops.

(10) The exit gases for all feeds contain approximately 13.9 lb./hr. non-condensibles and 1.0 lb./hr. water, and therefore at 270° F., after the preheater, contain latent heat plus sensible heat (above the datum of 70° F.) of about 1800 B.t.u./hr. The heat loss from the surface of insulation 116, 118, 120 at 135° F., which is a cylinder 21.5 in. dia. x 25 in. long, is about 1800 B.t.u./hr. also. The leanest feed is reckoned to be washings at the end of the cycle, and its heat of combustion is taken as zero. The required maximum rate of heat supply from an external source is therefore 1800+1800−0=3600 B.t.u./hr.=1 k.w., approximately.

This then, plus a margin for speed of heating, is the fixed rate which is controlled "on" and "off" by the thermosensitive element 102 in the second combustion chamber 98.

(11) The average production of garbage from the average household contains 0.05 lb. ash per day. This ash has a bulk density of about 25 lb./ft.³. One hundred years' production would therefore amount to 1825 lbs. with a volume of 72 ft.³. Thus the main vault may be 4 ft. x 4 ft. x 5 ft.

I claim:

1. Apparatus for burning to a very high degree of completeness material such as garbage which normally has a low average oxygen demand but at times has inclusions with a very high oxygen demand and which during heating evolves gas-phase substances while leaving solid-phase substances which on combustion evolve further gas-phase substances, comprising means for comminuting any solid components of said material, means for thereafter feeding said material blobwise at a substantially constant overall rate into a first chamber, means for preheating air, means for introducing preheated air turbulently into contact with said material within said chamber at a constant rate sufficient to give partial pressure of oxygen in predetermined excess over the maximum stoichiometric oxygen demand of any inclusion, said feeding means including means for conducting each successive blob of said material into contact with a preheated surface within said first chamber, means for scraping said surface bare at frequent intervals, means for heating said surface to preheat it and to transfer heat to said material at a rate sufficient, in view of the rate of feed and also in view of the heat transferred to said material by all other sources, to evolve gas-phase substances from and thus reduce cohesiveness of said blobs so rapidly that the action of said scraping means and the turbulence of said current of incoming air is effective to disperse said material in particulate form in said air without accumulation of nondispersed material within said chamber, a second chamber means for transferring said gas-phase substances and said air as a combined stream from said first chamber to said second chamber, said second chamber including means for retaining this combined stream in turbulent heated condition to complete the combustion thereof to said high degree in said second chamber, and means for retaining said particulate material in turbulent contact with air in the heated first chamber until the solid-phase substances thereof also are burned to said high degree of completeness.

2. Apparatus for burning to a very high degree of completeness material such as garbage which normally has a low average oxygen demand but at times has inclusions with a very high oxygen demand and which during heating evolves gas-phase substances while leaving solid-phase substances which on combustion evolve further gas-phase substances, comprising means for finely dividing said material, means for feeding and dispersing said finely divided material at a substantially constant overall rate into a heated first chamber, means for introducing air turbulently into contact with said finely divided material within said chamber at a constant rate sufficient to give a partial pressure of oxygen in predetermined excess over the maximum stoichiometric oxygen demand of any inclusion, heating means supplied by a source in addition to the heat of combustion of said material and evolved substances for heating said finely divided dispersed material and said turbulent air together at such a rate that the rate of evolution of gas-phase substances from said material is substantially the same as the rate of feeding, means for transferring said gas-phase substances and said air as a combined stream from said first chamber to a second chamber, said second chamber including means for retaining this combined stream in turbulent heated condition to complete the combustion thereof to said high degree in said second chamber, a heat exchanger, means for transferring said combusted combined stream from said second chamber to said heat exchanger, means for conducting said air through said heat exchanger to preheat said air prior to introduction of said air into contact with said finely divided material, temperature-sensitive means responsive to the temperature at a predetermined point within said apparatus, means under the control of said temperature-sensitive means for varying the amount of heat supplied to said heating means by said source inversely to changes in temperature detected by said temperature-sensitive means, and means for retaining the solid-phase substances in turbulent contact with air in the heated first chamber until said solid-phase substances also are burned to said high degree of completeness.

3. Apparatus for burning to a very high degree of completeness material such as garbage which normally has a low average oxygen demand but at times has inclusions with a very high oxygen demand and which during heating evolves gas-phase substances while leaving solid-phase substances which on combustion evolve further gas-phase substances, comprising means for finely dividing said material, means for feeding and dispersing said finely divided material at a substantially constant overall rate into a heated first chamber, means for introducing air turbulently into contact with said finely divided material within said chamber at a constant rate sufficient to give a partial pressure of oxygen in predetermined excess over the maximum stoichiometric oxygen demand of any inclusion, heating means supplied by a source in addition to the heat of combustion of said material and evolved substances for heating said finely divided dispersed material and said turbulent air together at such a rate that the rate of evolution of gas-phase substances from said material is substantially the same as the rate of feeding, means for transferring said gas-phase substances and said air as a combined stream from said first chamber to a second chamber, said second chamber including means for retaining this combined stream in turbulent heated condition to complete the combustion thereof to said high degree in said second chamber, a heat exchanger, means for transferring said combusted combined stream from said second chamber to said heat exchanger for passage therethrough to the atmosphere, said heat exchanger including means defining a passageway for air through said heat exchanger for introduction in preheated condition into contact as aforesaid with said finely divided material, temperature-sensitive means responsive to the temperature at a predetermined point within said apparatus, means under the control of said temperature-sensitive means for supplying or terminating the supply of heat from said source to said heating means in response respectively to decrease below or increase above a predetermined operating temperature detected by said temperature-sensitive means, means under the control of said temperature-sensitive means for conducting substantially all of said air through said first passageway to be preheated in normal operation of said apparatus and for conducting said air at a substantially lower temperature into contact as aforesaid with said finely divided material when in operation of said apparatus said sensing means detects after termination of supply of heat from said source a continued increase in temperature above said predetermined temperature, and means for retaining the solid-phase substances in turbulent contact with air in the heated first chamber until said solid-phase substances also are burned to said high degree of completeness.

4. Apparatus for burning to a very high degree of completeness material such as garbage which normally has a low average oxygen demand but at times has inclusions with a very high oxygen demand and which during heating evolves gas-phase substances while leaving solid-phase substances which on combustion evolve further gas-phase substances, comprising means for finely dividing said material, means for feeding and dispersing said finely divided material at a substantially constant overall rate into a heated first chamber, means for introducing air turbulently into contact with said finely divided material within said chamber at a constant rate sufficient to give a partial pressure of oxygen in predetermined excess over the maximum stoichiometric oxygen demand of any inclusion, heating means supplied by a source in addition to the heat of combustion of said material and evolved substances for heating said finely divided dispersed material and said turbulent air together at such a rate that the rate of evolution of gas-phase substances from said material is substantially the same as the rate of feeding, means for transferring said gas-phase substances and said air as a combined stream from said first chamber to a second chamber, said second chamber including means for retaining this combined stream in turbulent heated condition to complete the combustion thereof to said high degree in said second chamber, a heat exchanger, means for transferring said combusted combined stream from said second chamber to said heat exchanger for passage therethrough to the atmosphere, said heat exchanger including means defining a first selectively available passageway for air through said heat exchanger for introduction in preheated condition into contact as aforesaid with said finely divided material, bypass means defining a second selectively available passageway for air independent of said heat exchanger, for introduction in non-preheated condition into contact as aforesaid with said finely divided material, temperature-sensitive means responsive to the temperature at a predetermined point within said apparatus, means under the control of said temperature-sensitive means for supplying or terminating the supply of heat from said source to said heating means in response respectively to decrease below or increase above a predetermined operating temperature detected by said temperature-sensitive means, means under the control of said temperature-sensitive means for conducting substantially all of said air through said first passageway in normal operation of said apparatus and for conducting substantially all of said air through said second passageway when in operation of said apparatus said sensing means detects after termination of supply of heat from said source a continued increase in temperature above said predetermined temperature, and means for retaining the solid-phase substances in turbulent contact with air in the heated first chamber until said solid-phase substances also are burned to said high degree of completeness.

5. Apparatus as defined in claim 3 wherein said heat exchanger comprises a first tubular pipe of predetermined cross-sectional diameter defining a passageway for air to be preheated and a second tubular pipe of smaller cross-sectional diameter positioned substantially concentrically within said first pipe and defining a passageway for the gaseous material leaving said second combustion chamber, said first and second tubular pipes being wound into a helical coil surrounding said first and second chambers.

6. Apparatus as defined in claim 5 wherein said first chamber is substantially cylindrical, said second chamber is an annular enclosure substantially concentric with and surrounding said first chamber and thus has a cylindrical outer wall, and said helically coiled heat exchanger has an axial length substantially equal to the axial length of the cylindrical outer wall of said second chamber.

7. Apparatus as defined in claim 6 wherein one end of said second pipe communicates with the interior of said second chamber at a point adjacent one axial end of said second chamber, wherein the first helical turn of said coiled heat exchanger which extends from the point of communication of said second pipe with said second chamber has a diameter closely approximateing the diameter of the exterior wall of said second chamber and the second and subsequent helical turns have progressively increasing diameters, wherein said helically coiled heat exchanger is embedded in a body of thermal insulating material of annular form surrounding said second chamber, and wherein the rate of increase in diameter of successive helical turns of said heat exchanger is so chosen with respect to a predetermined rate of flow of air to be preheated that at any given point in the length of said heat exchanger the temperature of the preheated air therein is approximately equal to the temperature assumed by heat transfer from said chamber by the portion of said insulating material which is in contact with said heat exchanger at said given point.

8. In a combustion apparatus the combination of an enclosure of substantially cylindrical shape within which combustion occurs, means defining an exit for hot gaseous material from said enclosure, means for supplying combustion-supporting air to the interior of said enclosure including a preheater for said air, said preheater comprising a first tubular pipe of predetermined cross-sectional diameter defining a passageway for air to be preheated and a second tubular pipe of smaller cross-sectional diameter positioned substantially concentrically within said first pipe and communicating with the exit of said enclosure and defining a passageway for the gaseous material leaving said enclosure, a body of thermal insulating material of annular form surrounding the exterior of said chamber, said first and second pipes being wound into a helical coil and being embedded in said insulating material, and the axial length of said helical coil being substantially commensurate with the axial length of said cylindrical chamber.

9. Apparatus as defined in claim 8 wherein said means defining an exit from said enclosure is located at a point adjacent one axial end of said enclosure, wherein the first helical turn of said coiled heat exchanger which extends from said exit means has a diameter closely approximating the diameter of said cylindrical enclosure and the second and subsequent turns have progressively increasing diameters, and wherein the rate of increase in diameter of successive helical turns of said heat exchanger is so chosen with respect to a predetermined rate of flow of air to be preheated that at any given point in the length of said exchanger the temperature of the preheated air therein is approximately equal to the temperature assumed by heat transfer from said enclosure by the portion of said insulating material which is in contact with said heat exchanger at said given point.

10. In apparatus for burning a comminuted combustible material which may contain moisture, the combination of an enclosed chamber having heated surfaces therein, means for continuously scraping bare at frequent intervals at least one of said heated surfaces, means for supplying a turbulent current of heated air to the interior of said chamber, means for directing a supply of comminuated material to the interior of said chamber and directly into contact with said scraped heated surface therein, the rate of said supply of comminuted material being so related with the rate of heat transfer from said heated surfaces and said heated air to said comminuted material as to evolve gas-phase substances from and thus reduce cohesiveness of said comminuted material so rapidly that the action of said scraping means and the turbulence of said current of incoming air is effective to disperse said material in particulate form in said air without accumulation of non-dispersed material within said chamber.

11. The apparatus set forth in claim 10 wherein the inner surface of said chamber is cylindrical, wherein a second scraping means is provided for said inner surface of said chamber comprising a rotatable spiral blade nested within and coextensive in axial length with the cylindrical inner surface of said chamber, wherein an exit opening is provided near the lowermost point on said inner surface of said chamber, and wherein means is provided to drive said rotatable spiral blade in such direction as to move solid materials scraped thereby from the inner surface of said chamber toward said exit opening.

12. The apparatus set forth in claim 11 wherein the means provided to supply said stream of air to the interior of said chamber includes an air inlet opening positioned adjacent said exit opening and arranged to direct a blast of air against the solids being advanced by said spiral blade to prevent said solids from entering said exit opening so long as said stream of air is being supplied.

13. The apparatus set forth in claim 12 wherein an ash chute is connected at one end with said exit opening, a vault closed to the atmosphere is connected to the opposite end of said ash chute, wherein means is provided to terminate the supply of air through said inlet opening, and wherein means is provided to rotate said spiral blade after said termination whereby solids being advanced by said spiral blade will enter said exit opening to be conducted by said chute to said vault.

14. The apparatus set forth in claim 1 wherein means is provided to withdraw the combusted combined stream from said second chamber at such a rate as throughout the combustion of any material in said apparatus to maintain in said first chamber a gaseous pressure which is at least slightly below ambient atmospheric pressure.

15. The apparatus as set forth in claim 2 wherein said air is conducted into said heat exchanger at a predetermined gaseous pressure and means is provided to withdraw said combined combusted stream from said heat exchanger at a gaseous pressure sufficiently below said predetermined gaseous pressure as throughout the combustion of any material in said apparatus to maintain in said first chamber a gaseous pressure which is at least slightly below ambient atmospheric pressure.

16. The apparatus as set forth in claim 2 wherein the predetermined point at which said temperature-sensitive means is responsive is located within said second chamber.

17. The apparatus as set forth in claim 1 wherein said means for retaining said combined stream in said second chamber is an elongated passageway having a cross-sectional area so related to the mass-flow rate and viscosity of said combined stream as to produce and maintain a turbulence of flow represented by a Reynolds number above about 2100, and having a length so related to said cross-sectional area and the volumetric flow rate of said combined stream as to make the retention time of each volumetric element of said combined stream adequate for the combustion of the combustible portion thereof to said high degree.

18. In an apparatus for burning to a very high degree the combustible portion of continuously flowing gaseous material having a known maximum stoichiometric oxygen demand per unit volume thereof, the combination of an enclosure within which said gaseous material is continuously flowing, means for continuously forcing a stream of air into said enclosure and for introducing said air turbulently into contact with said gaseous material within said enclosure at a rate which is such in view of the rate of flow of and the maximum stoichiometric oxygen demand of said gaseous material as to establish and maintain at all times in the mixture of said air and said gaseous material at least a predetermined minimum partial pressure of oxygen in excess of said known maximum demand, said enclosure including an elongated passageway, means for conducting all of said mixture through said passageway, said passageway having a cross-sectional area which is so small in relation to the viscosity and the minimum combined flow rate of said mixture through said passageway as not only to produce a turbulence of flow through the length of said passageway represented by a Reynolds' number above about 2100, but also is so small as to prevent short-circuiting and gross back-mixing of volumetric units of said mixture, heating means associated with said enclosure for supplying heat to said mixture in addition to any heat generated by oxidation of said gaseous material, temperature-sensitive means responsive to the temperature of said mixture at a predetermined point in said passageway, means under the control of said temperature-sensitive means for starting or terminating the supply of heat by said heating means in response respectively to decrease below or increase above a predetermined minimum operating temperature detected by said temperature-sensitive means, and said passageway being long enough in relation to said cross-sectional area and the flow rate of said mixture to retain every volumetric unit of said mixture for a time sufficient in relation to said minimum partial pressure of oxygen in excess, the turbulence, and said minimum operating temperature to complete within said passageway the oxidation of the combustible portion of every volumetric unit of said mixture to said very high degree.

References Cited

UNITED STATES PATENTS

| | | | |
|---|---|---|---|
| 588,975 | 4/1896 | McClellan | 110—15 X |
| 1,697,524 | 1/1929 | Epstein | 110—18 |
| 1,797,335 | 3/1931 | Fedeler | 110—15 |
| 2,045,115 | 6/1936 | Allen et al. | 110—15 |
| 2,125,720 | 8/1938 | Hartley | 110—12 |
| 2,798,928 | 7/1957 | Friedberg | 110—18 X |

JAMES W. WESTHAVER, *Primary Examiner.*